(12) United States Patent
Sakaguchi et al.

(10) Patent No.: US 9,817,412 B2
(45) Date of Patent: Nov. 14, 2017

(54) PROTECTION CIRCUIT AND CONTROL CIRCUIT

(71) Applicant: MINEBEA CO., LTD., Kitasaku-gun, Nagano (JP)

(72) Inventors: Takahiro Sakaguchi, Kokubunji (JP); Shinji Tanaka, Yokohama (JP); Atsushi Kikuchi, Fujisawa (JP); Keiji Kobayashi, Yokohama (JP)

(73) Assignee: Minebea Co., Ltd., Nagano (JP)

( * ) Notice: Subject to any disclaimer, the term of this patent is extended or adjusted under 35 U.S.C. 154(b) by 273 days.

(21) Appl. No.: 14/669,452

(22) Filed: Mar. 26, 2015

(65) Prior Publication Data

US 2015/0277457 A1    Oct. 1, 2015

(30) Foreign Application Priority Data

Mar. 28, 2014   (JP) ................. 2014-068384

(51) Int. Cl.
| | |
|---|---|
| H02H 9/00 | (2006.01) |
| G05F 1/46 | (2006.01) |
| H02M 1/36 | (2007.01) |
| H02M 1/32 | (2007.01) |
| H02M 7/48 | (2007.01) |
| H02H 7/08 | (2006.01) |
| H02H 7/10 | (2006.01) |
| G06F 1/28 | (2006.01) |

(52) U.S. Cl.
CPC ........... *G05F 1/468* (2013.01); *H02H 7/0833* (2013.01); *H02H 7/10* (2013.01); *H02M 1/32* (2013.01); *H02M 1/36* (2013.01); *H02M 7/48* (2013.01); *G06F 1/28* (2013.01); *H02H 9/004* (2013.01)

(58) Field of Classification Search
USPC .......................................... 361/18, 93.7–93.9
See application file for complete search history.

(56) References Cited

U.S. PATENT DOCUMENTS

| | | | | |
|---|---|---|---|---|
| 5,539,610 A | * | 7/1996 | Williams | ............. H02H 11/003 307/10.7 |
| 5,642,251 A | * | 6/1997 | Lebbolo | ................. H02H 3/087 361/115 |

(Continued)

FOREIGN PATENT DOCUMENTS

| | | |
|---|---|---|
| JP | H05-003626 A | 1/1993 |
| JP | H08275392 A | 10/1996 |

(Continued)

OTHER PUBLICATIONS

Office Action dated Sep. 20, 2016 in the corresponding Japanese Patent Application No. 2014-68384.

(Continued)

*Primary Examiner* — Danny Nguyen
(74) *Attorney, Agent, or Firm* — Carrier Blackman & Associates, P.C.; Joseph P. Carrier; Jeffrey T. Gedeon

(57) ABSTRACT

A protection circuit is provided with: a suppression element that is coupled to a power source side of a main circuit and suppresses current flowing into the main circuit that drives a load; and a soft start circuit that is configured to gradually increase voltage of a control terminal of the suppression element when voltage is applied to the soft start circuit from a boosting circuit used for controlling the main circuit.

18 Claims, 5 Drawing Sheets

(56) References Cited

U.S. PATENT DOCUMENTS

| | | | |
|---|---|---|---|
| 5,973,942 A * | 10/1999 | Nelson | H02H 9/001 |
| | | | 323/901 |
| 7,324,316 B2 | 1/2008 | Chen et al. | |
| 8,619,400 B2 * | 12/2013 | Dobkin | H02H 1/06 |
| | | | 361/91.1 |
| 2006/0082407 A1 | 4/2006 | Simonson | |
| 2011/0019316 A1 * | 1/2011 | Zhan | H02M 1/32 |
| | | | 361/18 |

FOREIGN PATENT DOCUMENTS

| | | | |
|---|---|---|---|
| JP | 2001228943 A | 8/2001 |
| JP | 2006-033836 A | 2/2006 |
| JP | 2006121691 A | 5/2006 |
| JP | 2007082374 A | 3/2007 |
| JP | 2012-231347 A | 11/2012 |

OTHER PUBLICATIONS

Office Action dated May 23, 2017 in the counterpart Japanese patent application 2014-068384.

* cited by examiner

PROTECTION CIRCUIT AND CONTROL CIRCUIT

BACKGROUND

1. Field of the Invention

The present invention relates to a protection circuit and a control circuit each for preventing failure or malfunction of a device due to abnormal current.

2. Description of the Related Art

In order to prevent failure or malfunction of a device due to abnormal current, there is provided a protection circuit that suppresses an inrush current, which occurs when the power is turned on, and protects an electronic circuit from reverse connection of a power source. In this respect, the reverse connection of the power source means that the power source is erroneously connected to the electronic circuit with reverse polarity. P-channel MOSFETs (Metal-Oxide-Semiconductor Field-Effect Transistor) are often used for this protection circuit.

In recent years, there has been increased demand for a protection function for preventing failure or malfunction of a device due to abnormal current to a control circuit of a device such as a general-purpose fan motor as well as a communication device and a server. Thus, the protection function is required as standard to be embedded in an IC motor driver, thereby reducing external components to make the control circuit compact and reduce cost thereof.

JP-A-2006-033836 describes a problem to be solved Where "a hot swap circuit system of a fan module capable of reducing manufacturing costs of the system, and for making the system to be operable in a condition of large current and voltage while improving stability of the system" is provided. This publication describes a solution where "the hot swap circuit system of the fan module includes a soft: start circuit module for powering a power source of the fan module when the fan module is made hot plug to an application system. The soft start circuit module has a capacitor and a field effect transistor wherein the capacitor discharges potential when an input voltage of the soft start circuit module is switched from a non-zero value to a zero value, and the field effect transistor goes to an off-state when the input voltage of the soft start circuit module is switched from the non-zero value to the zero value".

The hot swap circuit described in JP-A-2006-033836 uses a P-channel MOSFET. However, as compared with an N-channel MOSFET, a chip size of a P-channel MOSFET is larger, more expensive and difficult to make in a fabrication process. For these reasons, in recent years, the number of suppliers of P-channel MOSFETs has decreased and hence product lines have also decreased. Thus, the availability of these MOSFETs in the future is questionable. As a result, a protection circuit capable of using an N-channel MOSFET is desired.

Further, the hot swap circuit described in IP-A-2006-33836 does not have the function of protecting an electronic circuit from the reverse connection of the power source.

SUMMARY

The present invention has been made in view of the above circumstances, and one of the objects of the invention to provide a protection circuit and a control circuit, each for preventing failure or malfunction of a device due to abnormal current, by using N-channel MOSFETs.

According to an illustrative embodiment of the present invention, there is provided a protection circuit including: a suppression element that is coupled to a power source side of a main circuit and suppresses current flowing into the main circuit that drives a load; and a soft start circuit that is configured to gradually increase voltage of a control terminal of the suppression element when voltage is applied to the soft start circuit from a boosting circuit used for controlling the main circuit.

According to another illustrative embodiment of the present invention, there is provided a control circuit including: a power source node that is applied with voltage of a power source; a main circuit that drives a load in response to a control signal having boosted voltage; a power supply path that is provided between the main circuit and the power source node; a boosting circuit that generates boosted voltage that is higher than the voltage of the power source; a suppression element that includes a first terminal, a second terminal and a first control terminal and is provided in the power supply path, the suppression element being configured to control a connection state between the first terminal and the second terminal in response to voltage applied to the first control terminal; and a soft start circuit that is configured to gradually increase voltage applied to the first control terminal of the suppression element when the boosted voltage is applied to the soft start circuit from the boosting circuit.

According to yet another embodiment of the present invention, there is provided a protection circuit including: a power source node applied to a power source voltage; a power supply path provided between the power source node and a main circuit block, the main circuit block being driving a load in response to a control signal having a boosted voltage; a boosting circuit for generating a signal having the boosted voltage being higher than the power source voltage; a suppression element provided in the power supply path and having a first terminal, a second terminal and a first control terminal, the suppression element being configured to control a conduction state between the first terminal and the second terminal in response to a signal based on the boosted voltage and applied to the first control terminal, and a reverse connection protection element provided in the power supply path and provided in series to the suppression element and having a third terminal, a fourth terminal and a second control terminal, the reverse connection protection element being configured to control a conduction state between the third terminal and the fourth terminal in response to a signal based on the boosted voltage and applied to the second control terminal, wherein the suppression element and the reverse connection protection element are assembled within a single package.

DETAILED DESCRIPTION

Hereinafter, embodiments of the invention will be described with reference to the drawings The terms "first", "second, "third", and the like in the description and in the claims, if any, are used for distinguish between similar elements and not necessarily for describing a particular sequential order. Furthermore, the term "connected" and "coupled" and related terms are used in an operational sense and are not necessarily limited to a direct connection or coupling.

Figure 4:
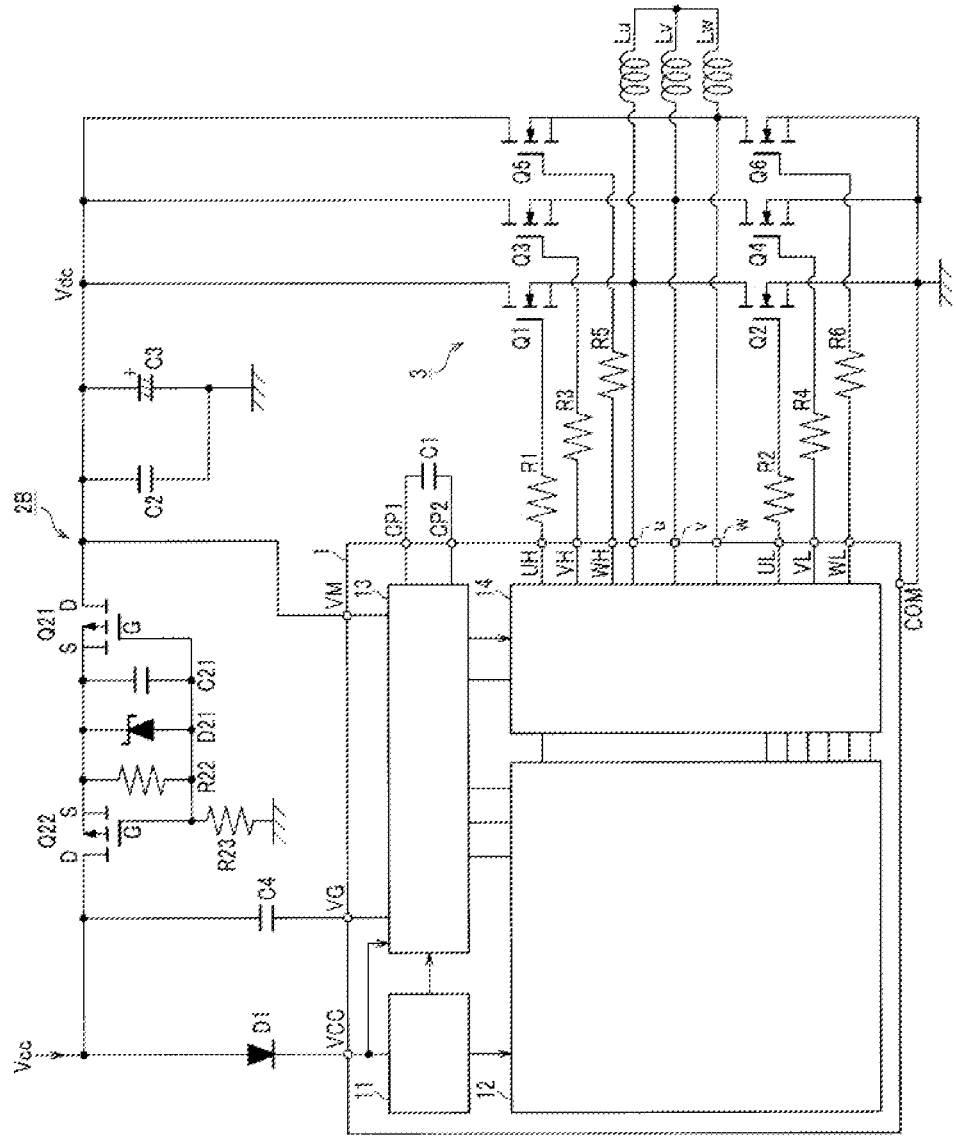
FIG. 4 is a circuit diagram of a comparative example showing a protection circuit, a motor driver and a peripheral circuit thereof.

FIG. 4 is a circuit diagram of a comparative example showing a protection circuit 2B, a motor driver 1 and a peripheral circuit thereof.

As shown in FIG. 4, the motor driver 1 includes a regulator 11, a controller 12, a charge pump 13 and a pre-driver 14. The motor driver 1 controls a main circuit 3 that drives a motor. The motor driver 1 is supplied with voltage Vcc from a power source and outputs a control signal to the main circuit 3.

The protection circuit 2B includes a reverse connection protection element Q22 and a suppression element Q21 each configured by a P-channel MOSFET. The protection circuit 2B prevents failure or malfunction of a device due to abnormal current. The protection circuit 2B enables hot-plugging/unplugging of the main circuit 3 or enables connection and disconnection with the power source even during an operational state of the main circuit 3. In this respect, hot-plugging and unplugging means that the control circuit of the motor or a cable can be changed during the turning-on state of the device, and is sometimes called "hot swap".

The suppression element Q21 is connected to the power source side of the main circuit 3 and suppresses inrush current when the power is turned on. The reverse connection protection element Q22 protects an electronic circuit from the reverse connection of a power source.

The main circuit 3 includes transistors Q1 to Q6 each configured by a P-channel MOSFET and resistors R1 to R6. The main circuit 3 energizes each of coils Lu, Lv, Lw as loads according to a control signal from the motor driver 1 to thereby drive the motor. In the main circuit 3, a U-phase switching; leg is configured by the transistors Q1 and Q2, a V-phase switching leg is configured by the transistors Q3 and Q4, and a W-phase switching leg is configured by the transistors Q5 and Q6. The coils Lu, Lv, Lw are connected to have a Y-connection to thereby configuring three-phase windings of the motor.

The power source is connected to the VCC terminal of the motor driver 1 via a diode D1 and applies a voltage Vcc to the regulator 11 and the charge pump 13. The regulator 11 drops the voltage Vcc to a predetermined voltage and applies the predetermined voltage to the charge pump 13 and the controller 12.

The charge pump 13 boosts the voltage Vcc applied thereto to a voltage higher than the applied voltage and applies the boosted voltage to the controller 12 and the pre-driver 14. The charge pump 13 is a boosting circuit for powering the coils Lu, Lv, Lw of the motor. With respect to the charge pump 13, a capacitor C1 is connected between a CP1 terminal and a CP2 terminal thereof, and a capacitor C4 is connected between a VG terminal thereof and the power source. Voltage Vdc is further applied to the charge pump 13 via a VM terminal.

The power source is also connected to the drain of the reverse connection protection element Q22 Which is configured by the P-channel MOSFET. The gate of the reverse connection protection element Q22 is grounded via a resistor R23 and also connected to the source thereof via a parallel connection of a resistor R22, a Zener diode D21 and a capacitor C21. The gate of the reverse connection protection element Q22 is further connected to the gate of the suppression element Q21. Current does not flow from the reverse connection protection element Q22 when the power source is connected with reverse polarity to thereby protect the main circuit 3.

The source of the suppression element Q21 is connected to the source of the reverse connection protection element Q22. The drain of the suppression element Q21 is connected to one end of a parallel circuit of a ceramic capacitor C2 and an electrolytic capacitor C3 for smoothing and also connected to the main circuit 3. Thus, the suppression element Q21 can apply a smoothed voltage Vdc to the main circuit 3.

The controller 12 outputs a control signal for the motor to the pre-driver 14. The pre-driver 14 boosts the control signal appropriately to turn on/off the transistors Q1 to Q6 of the main circuit 3. The COM terminal of the motor driver 1 is grounded.

The pre-driver 14 is connected to the gate of the transistor Q1 via a UH terminal and the resistor R1 and also connected to the gate of the transistor Q2 via a UL terminal and the resistor R2. The drain of the transistor Q1 is connected to the drain of the suppression element Q21 and voltage Vdc is applied. The source of the transistor Q1 is connected to the drain of the transistor Q2, one end of the coil Lu and a u terminal. The source of the transistor Q2 is grounded.

The pre-driver 14 is connected to the gate of the transistor Q3 via a VH terminal and the resistor R3 and also connected to the gate of the transistor Q4 via a VL terminal and the resistor R4. The drain of the transistor Q3 is connected to the drain of the suppression element Q21 and voltage Vdc is applied. The source of the transistor Q3 is connected to the drain of the transistor Q4, one end of the coil Lv and a v terminal. The source of the transistor Q4 is grounded.

The pre-driver 14 is connected to the gate of the transistor Q5 via a WH terminal and the resistor R5 and also connected to the gate of the transistor Q6 via a WL terminal and the resistor R6. The drain of the transistor Q5 is connected to the drain of the suppression element Q21 and voltage Vdc is applied. The source of the transistor Q5 is connected to the drain of the transistor Q6, one end of the coil Lw and a w terminal. The source of the transistor Q6 is grounded.

A comparable example of the the operation of the protection circuit 2B will be described below.

When the power source is connected to the protection circuit 2B with correct polarity, the voltage Vcc is applied to the drain of the reverse connection protection element Q22. According to the application of the voltage Vcc, current flows between the source and the drain of the reverse connection protection element 22 via the parasitic diode thereof. Due to the presence of the capacitor C21, voltage similar to the source voltage is transiently applied to each of the gate of the reverse connection protection element Q22 and the gate of the suppression element Q21. Thus, initially, each of the reverse connection protection element Q22 and the suppression element Q21 is in an off state.

Next, according to the charging/discharging of the capacitor C21, each of the gate voltage of the reverse connection protection element Q22 and the gate voltage of the suppression element Q21 reduces gradually and converges to a value obtained by dividing the source voltage by the resistors R22 and R23. As a result, each of the reverse connection protection element Q22 and the suppression element Q21 is turned on. Since the gate voltage of the suppression element Q21 reduces gradually, current flowing through the suppression element Q21 increases gradually.

When the power source is erroneously connected to the protection circuit 2B with reverse polarity, the drain of the reverse connection protection element Q22 is applied with the voltage of reverse polarity. Since the voltage applied to the reverse connection protection element Q22 is reverse voltage with respect to the parasitic diode thereof, current does not flow through this reverse connection protection element. Thus, each of the suppression element Q21 and the main circuit 3 is protected from the reverse connection.

Hereinbelow, embodiments according to the present invention will be described in detail.

In a first embodiment, a protection circuit 2 is configured by using N-channel MOSFETs on the power source side of a main circuit 3. The protection circuit 2 utilizes the output voltage of a charge pump 13. Thus, since an IC motor driver and the protection circuit 2 can be configured integrally, the number of components can be reduced and cost reduction can be realized.

Figure 1:
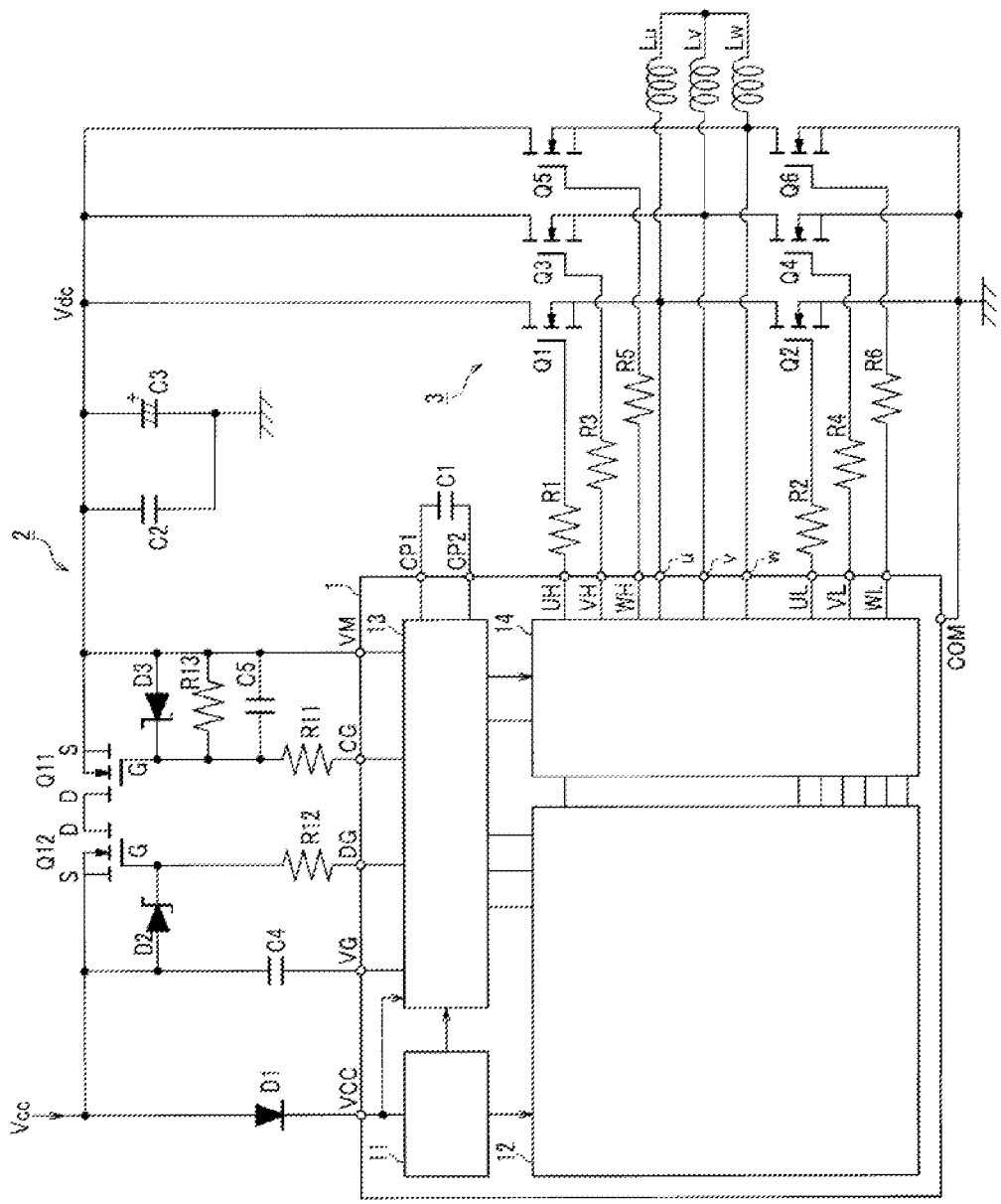
FIG. 1 is a circuit diagram showing a protection circuit, a motor driver and a peripheral circuit thereof, according to a first embodiment.

FIG. 1 is a circuit diagram of the first embodiment showing the protection circuit 2, a motor driver 1 and a peripheral circuit thereof.

As shown in FIG. 1, the motor driver 1 (a part of a control circuit) includes a regulator 11, a controller 12, the charge pump 13 and a pre-driver 14. The motor driver 1 controls the main circuit 3 to thereby drive the motor. The motor driver 1 is supplied with voltage Vcc from a power source and outputs a control signal to the main circuit 3 (a part of the control circuit).

The control circuit of the motor includes a power source node supplied with the voltage Vcc, the main circuit 3 for powering the motor, a power supply path provided between the main circuit 3 and the power source node, the charge pump 13, a suppression element Q11 and a soft start circuit having a resistor R11 and a capacitor C5.

The protection circuit 2 (a part of the control circuit) of the first embodiment includes a reverse connection protection element Q12 and the suppression element Q11 each configured by an N-channel MOSFET. The protection circuit 2 prevents failure or malfunction of a device due to abnormal current. The protection circuit 2 enables hot-plugging/unplugging of the min circuit 3 or enables connection and disconnection with the power source even during the operation state of the main circuit 3. The suppression element Q11 is connected to the power source side of the main circuit 3 and suppresses inrush current when the when the power is turned on. As well as the pre-driver 14, the protection circuit 2 utilizes voltage boosted by the charge pump 13.

The suppression element Q11 includes a source (first terminal), a drain (second terminal) and a gate (first control terminal) and is provided in the power supply path. The suppression element Q11 controls the connection state between the source and the drain thereof according to the voltage applied to the gate thereof.

The reverse connection protection element Q12 protects an electronic circuit from the reverse connection of the power source. The reverse connection protection element Q12 includes a drain (third terminal), a source (fourth terminal), a gate (second control terminal) and a parasitic diode. The reverse connection protection element Q12 is connected in series with the suppression element Q11 in the power supply path, and controls the connection state between the drain and the source thereof in response to the voltage applied to the gate thereof. The anode of the parasitic diode of the reverse connection protection element Q12 is connected to the power source node side, and the cathode of the parasitic diode is connected to the main circuit 3 side.

The source of the reverse connection protection element Q12 is connected to the power source node. The drain of the reverse connection protection element Q12 is connected to the drain of the suppression element Q11. The gate of the reverse connection protection element Q12 is connected to the charge pump 13 via a resistor R12. The reverse connection protection element Q12 may be connected to the source of the suppression element Q11.

In this embodiment, the reverse connection protection element Q12 is provided with the N-channel MOSFET. In detail, the N-channel MOSFET is formed on a surface of a semiconductor substrate having a p-type and has a source electrode having an n-type, a drain electrode having the n-type, a gate electrode, and a back gate electrode (the back gate electrode is also called as a substrate terminal) having the p-type. The source, drain and back gate electrodes are formed on the surface of the semiconductor substrate. The back gate electrode and the source electrode are commonly connected to the terminal applied to the power source VCC. Therefore, the parasitic diode is formed in the N-channel MOSFET so that the anode of the parasitic diode is the back gate electrode and the cathode of the parasitic diode is the drain electrode.

Figure 3A:
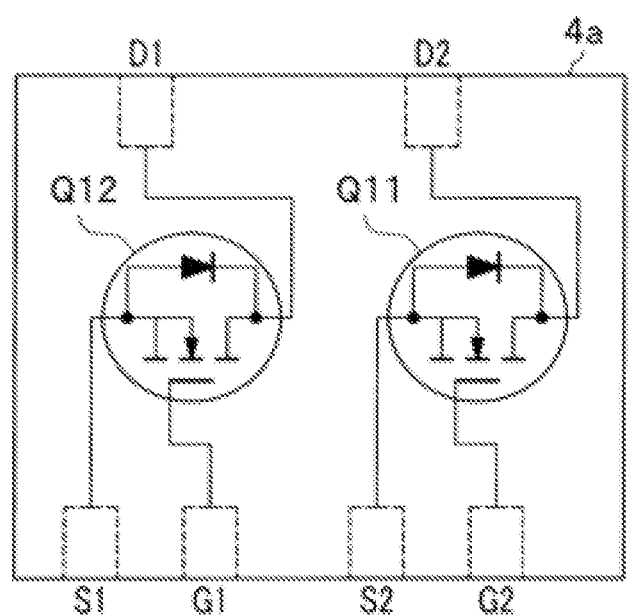
FIG. 3A-B are views showing examples of circuit diagrams of integrated circuits according to a second embodiment.
Figure 3B:
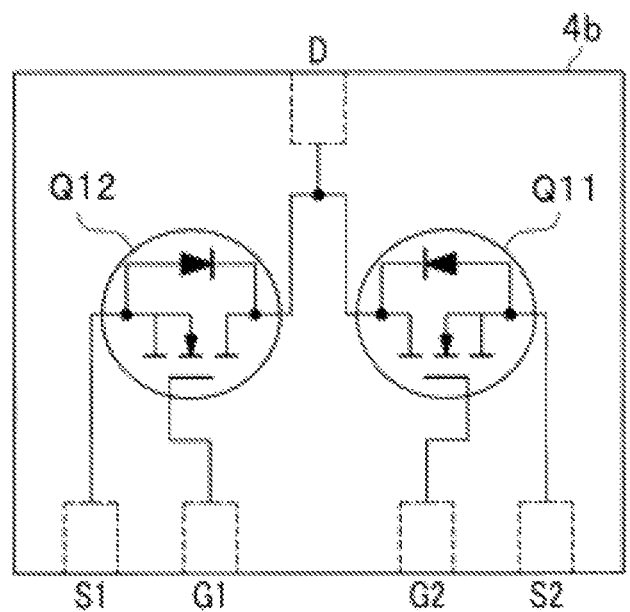

The suppression element Q11 is also provided with the N-channel MOSFET. In detail, the N-channel MOSFET is formed on a surface of a semiconductor substrate having the p-type and has a source electrode having the n-type, a drain electrode having the n-type, a gate electrode, and a back gate electrode having the p-type. The source, drain and back gate electrodes are formed on the surface of the semiconductor substrate. The back gate electrode and the source electrode are commonly connected to the terminal applied to the Vdc. Therefore, the parasitic diode is formed in the N-channel MOSFET so that the anode of the parasitic diode is the back gate electrode and the cathode of the parasitic diode is the drain electrode. The relationship between the parasitic diodes and N-channel MOSFETs are shown in FIG. 3A and FIG. 3B.

The main circuit 3 includes transistors Q1 to Q6 each configured by an N-channel MOSFET and resistors R1 to R6. The main circuit 3 energizes each of coils Lu, Lv, Lw as loads according to a control signal from the motor driver 1 to thereby drive the motor. In the main circuit 3, a U-phase switching leg is configured by the transistors Q1 and Q2, a V-phase switching leg is configured by the transistors Q3 and Q4, and a W-phase switching leg is configured by the transistors Q5 and Q6. The coils Lu, Lv, Lw are connected to have a Y-connection to thereby configuring three-phase windings of the motor.

The power source is connected to the VCC terminal of the motor driver 1 via a diode D1 and applies voltage Vcc to the regulator 11 and the charge pump 13. The regulator 11 drops the voltage Vcc to a predetermined voltage and applies the predetermined voltage to the charge pump 13 and the controller 12.

The charge pump 13 boosts the voltage Vcc applied thereto to a voltage higher than the applied voltage and applies the boosted voltage to the controller 12 and the pre-driver 14. The charge pump 13 is a boosting circuit for powering the coils Lu, Lv, Lw of the motor and for the protection circuit 2. With respect to the charge pump 13, a capacitor C1 is connected between a CP1 terminal and a CP2 terminal thereof, and a capacitor C4 is connected between a VG terminal thereof and the power source. Voltage Vdc is further applied to the charge pump 13 via a VM terminal. The charge pump 13 applies the boosted voltage to each of a DG terminal and a CG terminal to thereby apply the boosted voltage to the protection circuit 2.

The power source is also connected to the source of the reverse connection protection element Q12 which is configured by an N-channel MOSFET and also to a Zener diode D2. The gate of the reverse connection protection element Q12 is connected to the DG terminal via the resistor R12 and connected to the power source via the Zener diode D2. The Zener diode D2 limits the source-gate voltage of the reverse connection protection element Q12 to thereby protect the reverse connection protection element Q12. Current does not flow from the reverse connection protection element Q12 when the power source is connected with reverse polarity, thereby protecting the main circuit 3.

The drain of the suppression element Q11 is connected to the drain of the reverse connection protection element Q12. The gate of the suppression element Q11 is connected to the CG terminal via the resistor R11 and also connected to the source thereof via a parallel connection of a Zener diode D3, a resistor R13 and the capacitor C5. The Zener diode D3 limits the source-gate voltage of the suppression element Q11 to thereby protect the suppression element Q11. The soft start circuit configured by a time constant circuit having the resistors R11, R13 and the capacitor C5 gradually increases the gate voltage of the suppression element Q11. As a result, the suppression element Q11 suppresses an inrush current flow into the main circuit 3.

The source of the suppression element Q11 is connected to one end of a parallel circuit of a ceramic capacitor C2 and an electrolytic capacitor C3 for smoothing and also connected to the main circuit 3. Thus, the suppression element Q11 a smoothed voltage Vdc can be applied to the main circuit 3.

The controller 12 outputs a control signal for the motor to the pre-driver 14. The pre-driver 14 boosts the control signal appropriately to turn on/off the transistors Q1 to Q6 of the main circuit 3. The COM terminal of the motor driver 1 is grounded.

The configuration and operation of the main circuit 3 of the first embodiment is comparable to the example.

In the first embodiment, the protection circuit 2 utilizing the N-channel MOSFETs is provided on the power source side of the main circuit 3. The protection circuit 2 of the first embodiment turns the N-channel MOSFETs on by diverting the charge pump 13 of the motor driver 1.

Figure 2:
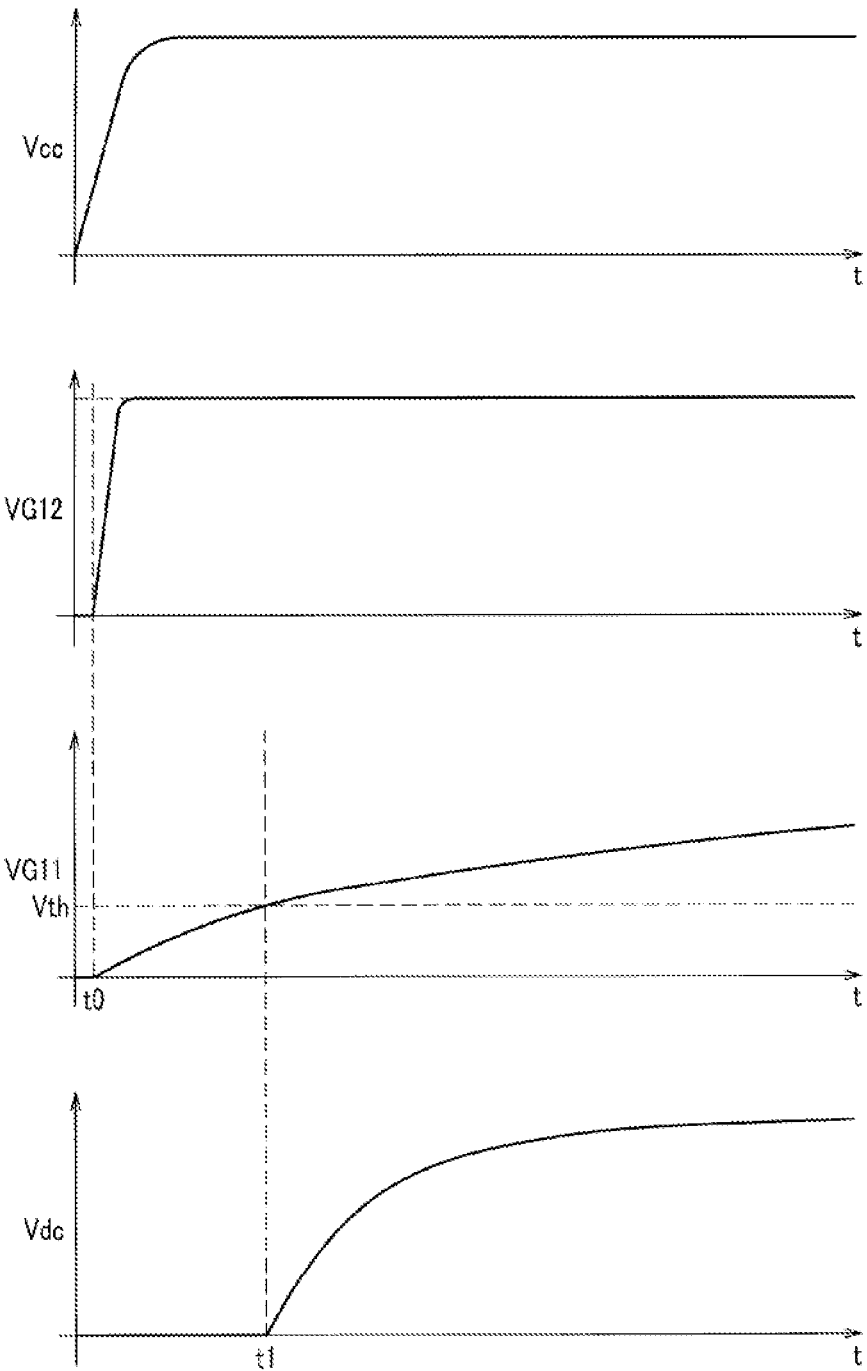
FIG. 2 is a timing chart showing the time scale for when the power source is powered-up in the first embodiment.

FIG. 2 is a timing chart showing the time scale for when the power source is powered-up in the first embodiment. In this case, this figure shows waveforms at respective portions in a case that the power source is connected with correct polarity.

The vertical axis of the first graph represents the voltage Vcc of the power source. The vertical axis of the second graph represents the gate voltage VG12 of the reverse connection protection element Q12. The vertical axis of the third graph represents the gate voltage VG11 of the suppression element Q11. The vertical axis of the fourth graph represents the voltage Vdc. The horizontal axis of each of the respective graphs represents the time.

At a time point t0, the power source is connected with correct polarity and the voltage Vcc is applied to the source of the reverse connection protection element Q12. When the voltage Vcc is applied, current flows between the source and the drain of the reverse connection protection element via the parasitic diode of the N-channel MOSFET.

On and after the time point t0, the charge pump 13 boosts the gate voltage VG12 of the reverse connection protection element Q12. When the gate voltage VG12 exceeds a threshold value, the reverse connection protection element Q12 is turned on. The gate voltage VG11 of the suppression element Q11 increases gradually by the charge pump 13 and the time constant circuit of the resistors R11, R13 and the capacitor C5.

At a time point a, when the gate voltage VG11 exceeds a threshold value Vth, the suppression element Q11 is turned on. Since the gate voltage VG11 of the suppression element Q11 increases gradually, current flowing through the suppression element Q11 also increases gradually.

When the power source is erroneously connected to the protection circuit 2 with reverse polarity, the source of the reverse connection protection element Q12 is applied with the voltage of reverse polarity. Since the voltage applied to the reverse connection protection element Q12 is reverse voltage with respect to a parasitic diode thereof, current does not flow through the reverse connection protection element Q12. Thus, each of the suppression element Q11 and the main circuit 3 is protected from the reverse connection.

The first embodiment explained above has the following advantages (A) to (D).

(A) An N-channel MOSFET, which is low in cost and available stably, can be utilized as each of the reverse connection protection element Q12 and the suppression element Q11 for inrush current.

(B) The protection circuit 2 diverts the charge pump 13 as the boosting circuit contained in the motor driver 1. Thus, since a dedicated boosting circuit is not necessary, the number of components can be reduced and cost reduction and miniaturization can be realized.

(C) The source of the reverse connection protection element Q12 is connected to the power source. The gate of the reverse connection protection element Q12 is connected to the power source via the Zener diode D2. This Zener diode D2 can limit the source-gate voltage of this reverse connection protection element to thereby protect the reverse connection protection element Q12.

(D) The gate of the suppression element Q11 is connected to the source thereof via the Zener diode D3. This Zener diode D3 can limit the source-gate voltage of this suppression element to thereby protect the suppression element Q11.

FIGS. 3A and B are diagrams showing examples of an integrated circuit according to a second embodiment according to the present invention.

FIG. 3A shows an integrated circuit 4a Where the two N-channel MOSFETs are assembled corresponding to the reverse connection protection element Q12 and the suppression element Q11 of the first embodiment within a single package to thereby providing a one package structure. Thus, a mounting area can be reduced. Further, since the number of components can be reduced, the number of mounting steps can also be reduced. The one-packaged integrated circuit 4a is configured in a manner that the two transistors formed on the same chip are assembled within the single package. However, the integrated circuit 4a may be configured in a manner that the two transistors respectively formed on different chips are assembled within a single package.

FIG. 3B shows an integrated circuit 4b where in the integrated circuit 4b the two N-channel MOSFETs are assembled corresponding to the reverse connection protection element Q12 and the suppression element Q11 of the first embodiment within a single package and the drains of the both elements are connected to each other within the package. Thus, the cathode of the parasitic diode of the reverse connection protection element Q12 and the suppression element Q11 can be connected to a common node within the package. As a result, the mounting area can be further reduced.

The present invention is not limited to the embodiments described above and can be changed within a range not departing from the scope of the invention. For example, the invention may be modified in the following manners (a) to (g).

(a) The protection circuit may be configured by assembling the transistors Q1 to Q6 for powering the motor as well as the reverse connection protection element Q12 and the suppression element Q11 within the single package of the integrated circuit.

(b) The motor driver added to the protection circuit is not limited to a three-phase power type. For example, the motor driver added with the protection circuit may be a single-phase power type.

(c) The boosting circuit utilized in the protection circuit is not limited to the charge pump 13 contained in the motor driver. The protection circuit for example, may utilize a circuit for other applications having a boosting circuit.

(d) The inrush current may be adjusted by the time constant circuit configured by a CR circuit. Alternatively, the inrush current may be adjusted by a soft start circuit, configured by a circuit other than the CR circuit, for gradually increasing arbitrary voltage.

(e) The inrush current may be adjusted by setting the boosted voltage of the charge pump 13.

(f) The protection circuit may be configured to include only the suppression element Q11 and the time constant circuit so as to have only an inrush current suppression function.

(g) The protection circuit may be configured so as to include at least one of the suppression element Q11 and the reverse connection protection element Q12 within the integrated circuit which assembles a plurality of N-channel MOSFETs within a single package.

What is claimed is:

1. A protection circuit comprising:
    a suppression element that is coupled to a power source side of a main circuit and suppresses current flowing into the main circuit that drives a load
    a soft start circuit that is configured to gradually increase voltage of a control terminal of the suppression element when voltage is applied to the soft start circuit from a boosting circuit used for controlling the main circuit; and
    a reverse connection protection element that is coupled to the power source side of the main circuit and prevents reverse current in a case that a power source is coupled to the main circuit with reverse polarity,
    wherein a control terminal of the reverse connection protection element is coupled to the boosting circuit.

2. The protection circuit according to claim 1,
    wherein the suppression element comprises an N-channel MOSFET.

3. The protection circuit according to claim 1,
    wherein the soft start circuit comprises a time constant circuit configured by a resistor and a capacitor.

4. The protection circuit according to claim 1,
    wherein the protection circuit is configured to enable hot-plugging/unplugging of the main circuit or to enable connection and disconnection with a power source during an operational state of the main circuit.

5. The protection circuit according to claim 1,
    wherein the reverse connection protection element comprises an N-channel MOSFET.

6. The protection circuit according to claim 5,
    wherein at least one of the suppression element and the reverse connection protection element is embedded in an integrated circuit with a plurality of N-channel MOSFETs, the integrated circuit being assembled within a single package.

7. The protection circuit according to claim 5,
    wherein the suppression element and the reverse connection protection element are assembled within a single package.

8. A control circuit comprising:
    a power source node that is applied with voltage of a power source;
    a main circuit that drives a load in response to a control signal having boosted voltage;
    a power supply path that is provided between the main circuit and the power source node;
    a boosting circuit that generates boosted voltage that is higher than the voltage of the power source;
    a suppression element that includes a first terminal, a second terminal and a first control terminal and is provided in the power supply path, the suppression element being configured to control a connection state between the first terminal and the second terminal in response to voltage applied to the first control terminal;
    a soft start circuit that is configured to gradually increase voltage applied to the first control terminal of the suppression element when the boosted voltage is applied to the soft start circuit from the boosting circuit; and
    a reverse connection protection element that includes a third terminal, a fourth terminal, a third control terminal and a parasitic diode, and is coupled in series to the suppression element in the power supply path, the reverse connection protection element being configured to control a connection state between the third terminal and the fourth terminal in response to voltage applied to the third control terminal,
    wherein an anode of the parasitic diode is coupled to the power source node, and
    wherein a cathode of the parasitic diode is coupled to the main circuit.

9. The control circuit according to claim 8,
    wherein the suppression element includes a first N-channel MOSFET, and
    wherein the main circuit includes a second N-channel MOSFET having a second control terminal that receives the control signal.

10. The control circuit according to claim 8,
    wherein the reverse connection protection element includes a third N-channel MOSFET,
    wherein the third terminal is coupled to the power source node,
    wherein the fourth terminal is coupled to one of the first terminal and the second terminal of the suppression element, and
    wherein the third control terminal is coupled to the boosting circuit.

11. The control circuit according to claim 10,
    wherein the suppression element and the reverse connection protection element are assembled within a single package.

12. The control circuit according to claim 11,
    wherein the cathode of the parasitic diode of the reverse connection protection element and the suppression element are coupled to a common node within the single package.

13. A protection circuit comprising:
a power source node applied to a power source voltage;
a power supply path provided between the power source node and a main circuit block, the main circuit block being driving a load in response to a control signal having a boosted voltage;
  a boosting circuit for generating a signal having the boosted voltage being higher than the power source voltage;
  a suppression element provided in the power supply path and having a first terminal, a second terminal and a first control terminal, the suppression element being configured to control a conduction state between the first terminal and the second terminal in response to a signal based on the boosted voltage and applied to the first control terminal; and
  a reverse connection protection element provided in the power supply path and provided in series to the suppression element and having a third terminal, a fourth terminal and a second control terminal, the reverse connection protection element being configured to control a conduction state between the third terminal and the fourth terminal in response to a signal based on the boosted voltage and applied to the second control terminal,
    wherein the suppression element and the reverse connection protection element are assembled within a single package.

14. The protection circuit according to claim 13,
wherein the suppression element and the reverse connection protection element are embedded in a single chip.

15. The protection circuit according to claim 14,
wherein the package has a common node for coupling the suppression element to the reverse connection protection element.

16. The protection circuit according to claim 13,
wherein the suppression element includes a first N-channel MOSFET having the first terminal, the second terminal, the first control terminal and a first back gate electrode,
wherein the reverse connection protection element includes a second N-channel MOSFET having the third terminal, the fourth terminal, the second control terminal and a second back gate electrode,
wherein the third terminal is coupled to the power source node, and
wherein the fourth terminal is coupled to the first terminal.

17. The protection circuit according to claim 16,
wherein the first N-channel MOSFET has a first parasitic diode having an anode and a cathode, the anode being the first back gate electrode and the cathode being the first terminal, and
wherein the second N-channel MOSFET has a second parasitic diode having an anode and a cathode, the anode being the second back gate electrode and the cathode being the fourth terminal.

18. The protection circuit according to claim 13 further comprising:
  a first diode having an anode coupled to the second terminal of the suppression element and a cathode coupled to the first terminal of the suppression element; and
  a second diode having an anode coupled to the third terminal of the reverse connection protection element and a cathode coupled to the fourth terminal of the reverse connection protection element.

* * * * *